United States Patent
Kowkutla et al.

(10) Patent No.: US 10,613,604 B2
(45) Date of Patent: Apr. 7, 2020

(54) ON CHIP POWER ON RESET WITH INTEGRATED SUPERVISORY FUNCTIONS FOR A FUNCTIONAL SAFETY SYSTEM

(71) Applicant: TEXAS INSTRUMENTS INCORPORATED, Dallas, TX (US)

(72) Inventors: Venkateswar Reddy Kowkutla, Allen, TX (US); Chunhua Hu, Plano, TX (US); Erkan Bilhan, Dallas, TX (US); Sumant Dinkar Kale, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/387,680

(22) Filed: Dec. 22, 2016

(65) Prior Publication Data

US 2018/0181179 A1    Jun. 28, 2018

(51) Int. Cl.
*G06F 1/24* (2006.01)
*G06F 1/28* (2006.01)

(52) U.S. Cl.
CPC . *G06F 1/24* (2013.01); *G06F 1/28* (2013.01)

(58) Field of Classification Search
CPC .................................. G06F 1/24; G06F 1/28
See application file for complete search history.

(56) References Cited

U.S. PATENT DOCUMENTS

| | | | | |
|---|---|---|---|---|
| 6,618,312 | B2 * | 9/2003 | Cheung | G06F 1/24 365/226 |
| 7,646,222 | B2 * | 1/2010 | Ichikawa | G06F 1/24 327/142 |
| 8,058,910 | B1 * | 11/2011 | Wright | G06F 1/24 327/143 |
| 9,473,114 | B1 * | 10/2016 | Sandhu | H03K 17/223 |
| 2005/0083736 | A1 * | 4/2005 | Fukui | G11C 5/147 365/185.18 |

* cited by examiner

*Primary Examiner* — Stefan Stoynov
(74) *Attorney, Agent, or Firm* — Ebby Abraham; Charles A. Brill; Frank D. Cimino

(57) ABSTRACT

A functional safety POR system requires implementing voltage detectors and supervisory functions in a complex SOC. These features are implemented within the SOC without external components. Three stages of voltage monitoring are implemented to ensure redundancy.

10 Claims, 2 Drawing Sheets

ON CHIP POWER ON RESET WITH INTEGRATED SUPERVISORY FUNCTIONS FOR A FUNCTIONAL SAFETY SYSTEM

TECHNICAL FIELD OF THE INVENTION

The technical field of this invention is reset signal generation.

BACKGROUND OF THE INVENTION

A functional safety system often requires implementing voltage detectors and supervisory functions for a complex System On a Chip (SoC) in a larger system. Implementing those functions outside of the SoC not only increases the overall system cost, it also lacks the critical features to achieve high level functional safety standard specified by ISO 2626 and IEC 61508.

SUMMARY OF THE INVENTION

A fully integrated method is shown of generating a Power On Reset (POR) on an SOC. Continuous voltage monitoring with integrated supervisory functions and reset sequencing is implemented, with redundant, three stage voltage monitoring. Voltage thresholds are adjusted by trim values stored in an efuse bank.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
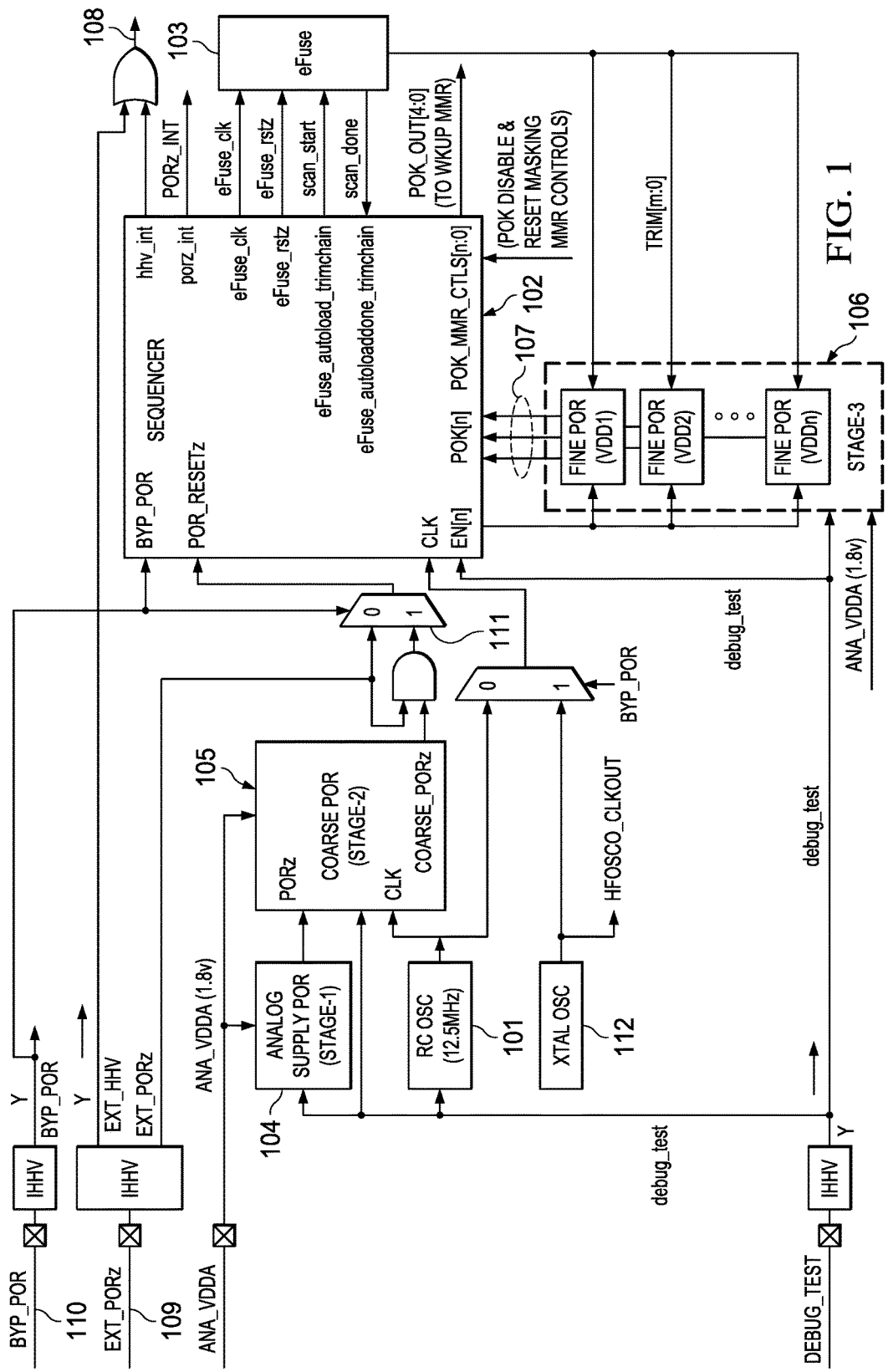
FIG. 1 shows a high level diagram of the reset circuit.

A fully integrated Power on Reset generation circuitry which can provide continuous voltage monitoring and reset sequencing is shown in FIG. 1. It incorporates control features such as redundancy and diagnostic capabilities which are critical to implement the functional safety feature.

The system includes an internal RC oscillator, circuits for three stages voltage of detection and a Power on Reset (PoR) sequencer.

The internal RC oscillator 101 and crystal oscillator 112 are used to generate the clocks required by the Power on Reset (PoR) sequencer 102 and efuse module 103. The outputs of voltage monitors 104, 105 and 106 are passed through deglitching circuits to filter out false signals such as glitches and noise from the analog sensors.

The first stage voltage detection circuit 104 is an analog supply level detector—this is to ensure that the voltage has reached a threshold level at which analog circuits can safely and reliably operate. The second stage voltage detection circuit 105 is a coarse level detector on analog voltage rails and some critical digital voltage rails, which are required for fine tuning analog sensors for process and temperature variations. The third stage voltage detection block 106 is a plurality of more accurate level detectors, which ensures that all voltage rails are operating within specified limits. The circuits implemented in first and second stage do not require any trim values to fine tune the analog circuits for process and temperature variation compensations. The first stage 104 controls the reset to the second stage 105, and second stage controls the reset to the third stage 106. Final reset 108 to the SoC will be a combined version of resets from all 3 stages. This ensures that the device will always receive a reset even if one of the stages is defective therefore providing the required redundancy needed for safety critical applications.

Once the voltage levels are valid, the second stage 105 releases reset to only a small portion of the device which enables the device to initiate the efuse scanning. The efuse block 103 contain analog trim values for the voltage detection circuits implemented in the third stage 106 for accurate voltage level monitoring. The third stage holds the reset to the designated voltage domains until it detects proper voltage levels on the rails.

After the efuse scanning in 103 is complete, the Power on Reset (PoR) sequencer 102 applies the trim values read out from the effuse block 103 to the analog circuits for the voltage monitors in the third stage 106. The sequencer then enables the voltage monitors for accurate detection of voltage levels on the rails. The sequencer then waits for a power-good (POK) signal 107 response from each individual detector circuit. When all the voltage monitors indicate power good on the rails, the sequencer waits for all IOs and clock oscillators in the device to stabilize and then de-asserts the reset 108 to the designated voltage domain.

Provision is made for an external reset signal 109 and 110 that will override the internally generated resets when selected by selector 111.

All reset signals are properly level shifted to the destination voltage level with appropriate pull-up or pull-down functions. This is to ensure that if the source voltage dies, the reset signal is still at an appropriate level to put the destination voltage domain in the reset state.

Figure 2:
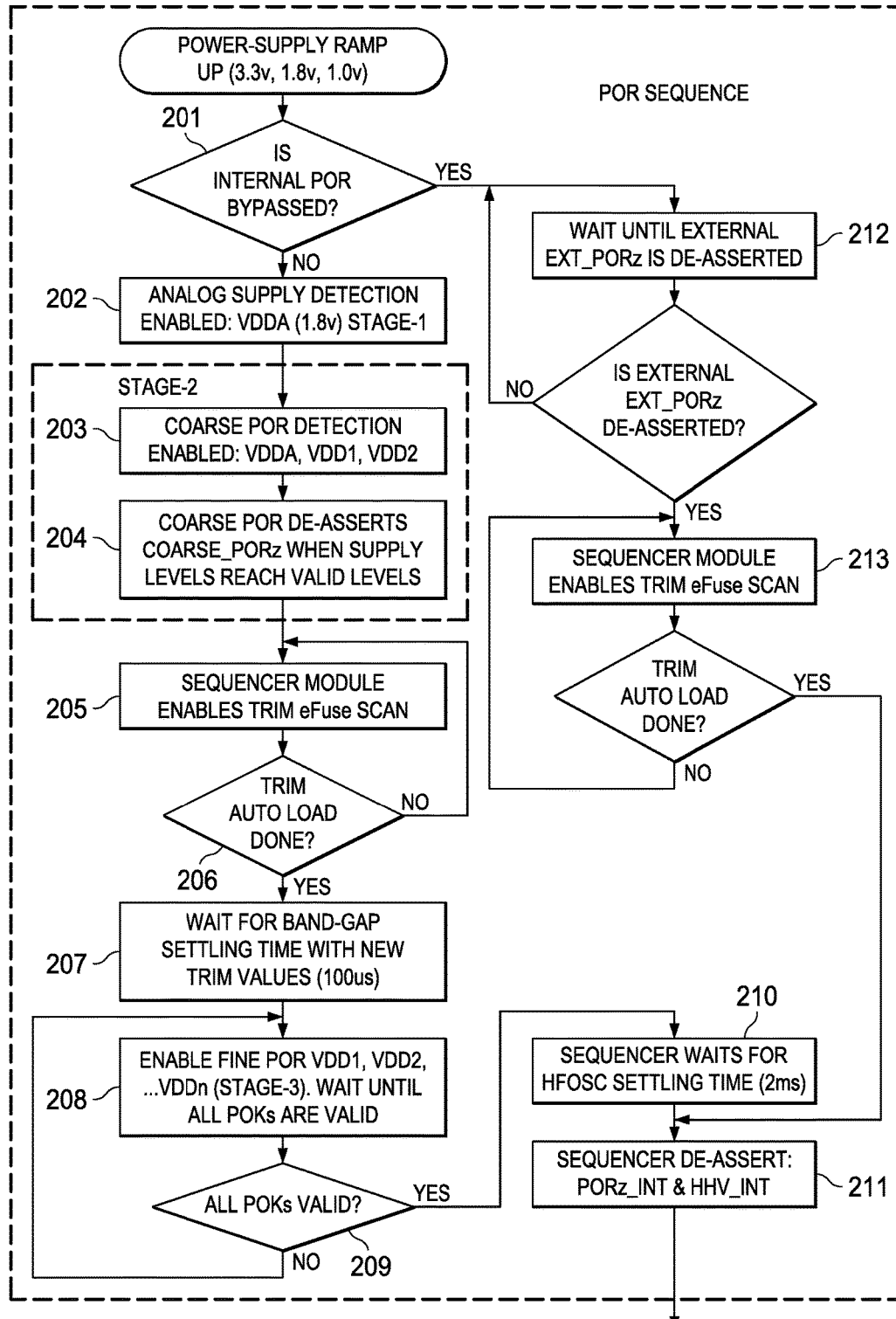
FIG. 2 is a flow chart of the reset function.

FIG. 2 shows the steps involved in the reset generation. Block 201 determines if the external POR is asserted. If not, analog supply detection is enabled in 202, followed by coarse POR detection in 203. When supply voltage levels reach valid levels, coarse POR is deasserted in 204. The sequencer module now enables the trim effuse scan in 205. When completion of the scan is determined in 206, a settling time is introduced in 207. After the settling time, the fine, corrected PORs are enabled. When all POK (Power OK) signals are valid as determined in 209, an oscillator settling time is introduced in 210, followed by the deassertion of the POR signals.

If an external POR signal is detected in 201, block 212 introduces a wait until the external POR signal is deasserted. Once that is detected, the trim effuse scan is enabled in 213. Once trim auto load is completed, flow returns to 211.

What is claimed is:
1. A system on a chip (SoC), comprising:
a first voltage detection circuit having a first input, a second input, and an output, the first input of the first voltage detection circuit is adapted to be coupled to a circuit, the second input of the first voltage detection circuit is adapted to receive an indication of a voltage threshold r;
a second voltage detection circuit having a first input, a reset input, and an output, the first input of the second voltage detection circuit is adapted to be coupled to the circuit and the reset input of the second voltage detection circuit is coupled to the first voltage detection circuit output;
a sequencer having an input and an output, the input of the sequencer is coupled to the output of the second voltage detection circuit; and an eFuse module having an input and configured to perform an eFuse scanning, the input of the eFuse module is coupled to the output of the sequencer.

2. The SoC of claim 1, wherein the second voltage detection circuit has a clock input and further comprising:
an RC oscillator having an output coupled to the clock input of the second POR stage.

3. The SoC of claim 2, further comprising:
a crystal oscillator having an output; and
a multiplexer having a first input, a second input, and an output, the first input of the multiplexer coupled to the output of the RC oscillator, the second input of the multiplexer coupled to the output of the crystal oscillator, and the output of the multiplexer coupled to the output of the sequencer.

4. A system on a chip (SoC), comprising:
an eFuse module having a first output and a second output, the eFuse module configured to perform an eFuse scan and produce a first analog trim value at the first output and a second analog trim value at the second output;
a power on reset (POR) module having a first input, a second input, a first output, and a second output, the first input of the POR module coupled to the first output of the eFuse module and the second input of the POR module coupled to the second output of the eFuse module, and the POR module configured to produce a first power ok (POK) signal at the first output based on the first input of the POR module and a second POK signal at the second output based on the second input of the POR module; and
a sequencer having a first input and a second input, the first input of the sequencer is coupled to the first output of the POR module and the second input of the sequencer is coupled to the second output of the POR module.

5. The SoC of claim 4, wherein the sequencer has a third input and an output and the eFuse module has an input and a third output, the output of the sequencer is coupled to the input of the eFuse module and the third input of the sequencer is coupled to the third output of the eFuse module, wherein the sequencer is configured to instruct the eFuse module to perform the eFuse scan, and the eFuse module is configured to indicate to the sequencer that the eFuse scan is done.

6. The SoC of claim 4, wherein the sequencer has a clock input and further comprising an RC oscillator having an output coupled to the clock input of the sequencer.

7. The SoC of claim 4, wherein the sequencer has a clock input and further comprising:
an RC oscillator having an output;
a crystal oscillator having an output; and
a multiplexer having a first input, a second input, and an output, the first input of the multiplexer is coupled to the output of the RC oscillator, the second input of the multiplexer is coupled to the output of the crystal oscillator, and output of the multiplexer is coupled to the clock input of the sequencer.

8. The SoC of claim 4, wherein the sequencer is further configured to deassert a reset a period of time after receiving the first POK signal and the second POK signal.

9. The SoC of claim 8, further comprising an OR gate, a first input of the OR gate coupled to a reset output of the sequencer and a second input of the OR gate coupled to an external reset signal.

10. A method of power on reset (POR), the method comprising:
performing, by an eFuse module of a system on a chip (SoC), an eFuse scan, to produce a first analog trim value and a second analog trim value;
monitoring, by a first voltage detection circuit of a fine power on reset (POR) stage of the SoC, an analog voltage based on the first analog trim value and to produce a first power ok (POK) signal;
monitoring, by a second voltage detection circuit of the fine POR stage, the analog voltage based on the second voltage detection circuit and to produce a second POK signal; and
producing, by a sequencer of the SoC, an output signal based on the first POK signal and the second POK signal.

* * * * *